UNITED STATES PATENT OFFICE.

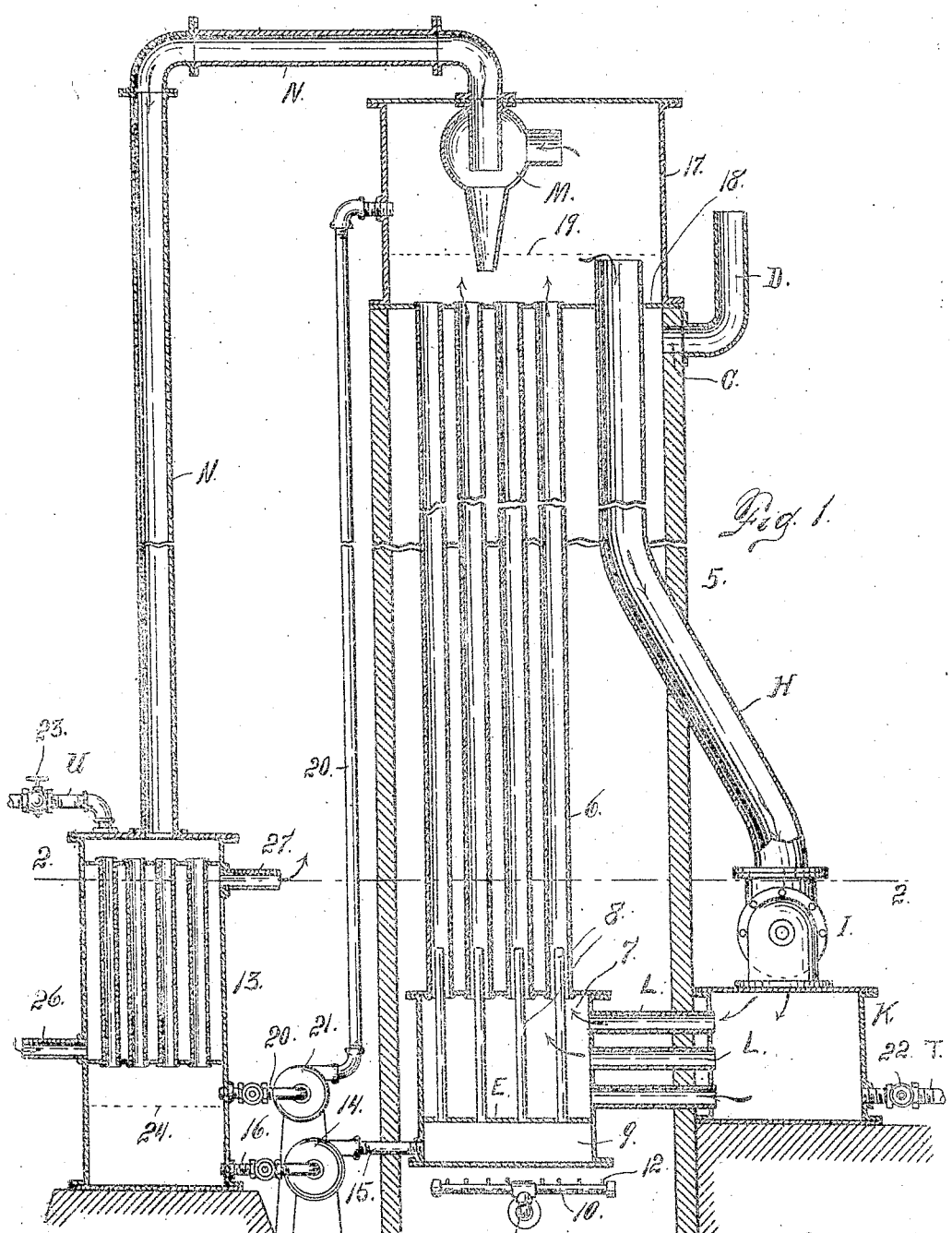

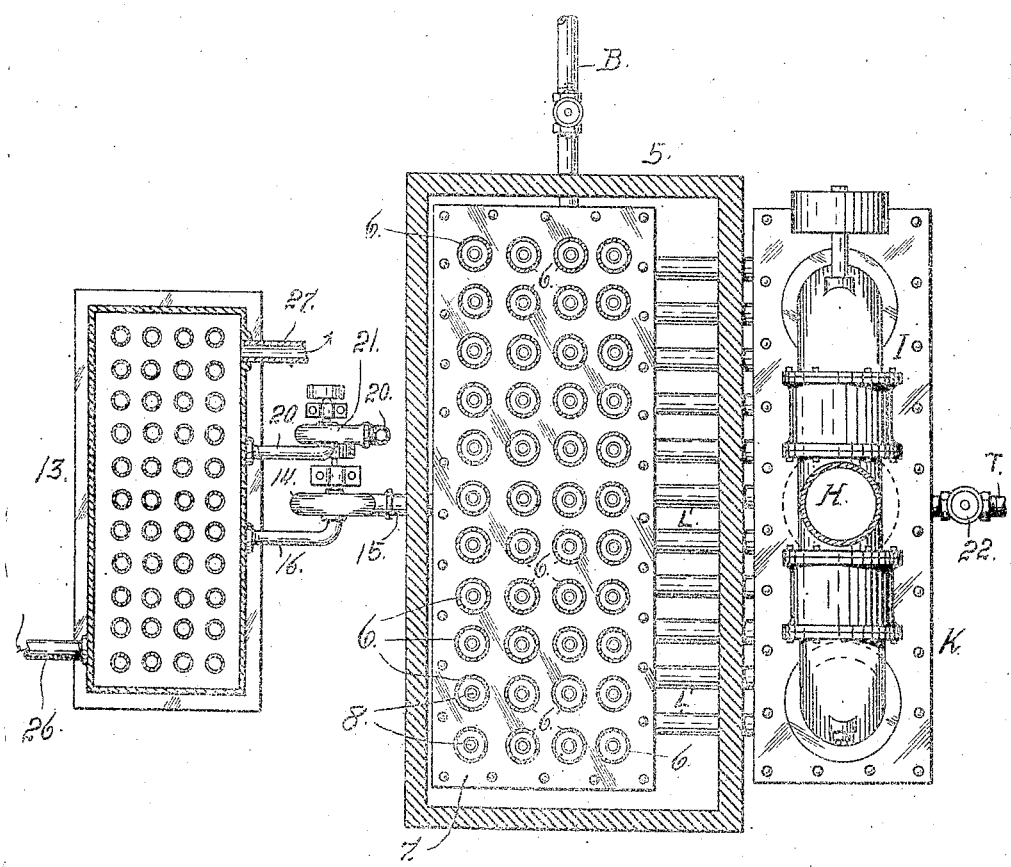

PAUL DANCKWARDT, OF DENVER, COLORADO.

POWER-PRODUCING APPARATUS.

933,022.  Specification of Letters Patent.  Patented Aug. 31, 1909.

Application filed April 14, 1908. Serial No. 426,976.

*To all whom it may concern:*

Be it known that I, PAUL DANCKWARDT, a citizen of the United States, residing in the city and county of Denver and State of Colorado, have invented certain new and useful Improvements in Power-Producing Apparatus; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to an apparatus for producing power from fuel or the heat of waste gases, exhaust steam, etc., by causing a body of a heated fluid to be set into motion by a current of gas, this gas being generated by the heat of the moving fluid upon another fluid substance which has a boiling point below that of the moving fluid and a very low latent heat and specific heat, and which is continually condensed and reintroduced as a fluid, the moving fluid before returning to its starting place, passing a turbine or other suitable motor whereby the velocity of its mass is transformed into power.

Having briefly outlined my improved construction, I will proceed to describe the same in detail reference being made to the accompanying drawing in which is illustrated an embodiment thereof.

In this drawing, Figure 1 is a vertical section taken through my improved apparatus. Fig. 2 is a horizontal section taken on the line 2—2 Fig. 1.

The same reference characters indicate the same parts in both views.

Let the numeral 5 designate a chimney-like structure built of any material for instance brick, cement or iron, preferably covered with an outside packing to prevent loss of heat by radiation. At the bottom is an opening through which a pipe B passes for the introduction of the heating gases to a pipe 10 which as shown in the drawing is provided with upwardly directed nozzles 12. The heating agent may consist of waste gases, exhaust steam or direct combustion gases. Near the top of the structure 5 is a port C communicating with a pipe D for the escaping gases. The top of the structure 5 is closed by a pan-like vessel 17. Inside of the structure 5 is placed the apparatus in which the circulation of the water or other fluid is produced. It consists of an iron box 7 provided with an extra bottom or partition E from which small pipes 8 extend upwardly through the top plate of the box into corresponding larger pipes 6. The latter extend through the bottom plate 18 of the vessel 17 and open into the latter. The upper extremities of these pipes are open and are tightly fitted into the plate 18. The top vessel 17, communicates by a relatively large return pipe H with a turbine or motor I of any description, which discharges the water or other solution into an iron box K below. This box is connected by a number of pipes L, with one side of the box 7. It may, however, be built integral with the box 7, since the pipes L only make provision for a larger heating surface. The top vessel 17 contains a moisture collector M communicating with a discharge pipe N. The collector M is set up with its lower extremity dipping into the water in the vessel M it being assumed that the level of the water is indicated by the dotted line 19. This prevents the gas from taking the wrong course. The pipe N leads to a condenser 13 of any construction, the drawing showing a simple pipe condenser, the bottom part of which is connected by means of a pipe 16, a pump 14 and a pipe 15 with the bottom compartment 9 of the iron box 7, and by means of a pipe 20 and a pump 21 with the top vessel 17.

T is a pipe with valve 22. This pipe may be employed either for the purpose of filling or emptying the apparatus.

U is a pipe provided with a valve 23. This pipe may be employed for introducing the carbon disulfid or other gas-producing medium, into the condenser.

In the operation of the apparatus I introduce through the pipe T sufficient water or fluid to fill the apparatus up to a level above the bottom of the vessel 17 or to the level indicated by the dotted line 19. Into the condenser 13, I introduce carbon disulfid or another suitable fluid, until it reaches nearly to the pipe 20 or to the level indicated by the dotted line 24. I then allow the heating gases to enter the device 10 through the pipe B, and regulate the heat so as to keep the temperature of the water or other circulating medium below its boiling point, but considerably above that of the gas-producing medium. The test may be made at any time on a sample drawn from the pipe T by opening the valve 22, or at any other suitable place where a pipe and faucet may be provided. When the circulating fluid has reached the proper temperature, I turn on the cooling water to the condenser which enters through a pipe 26 and passes out through a pipe 27. I then start the pump 14 which injects the carbon disulfid or other gas-producing medium, into the bottom compartment 9 of the box 7. The carbon disulfid will here be utilized, and the gas thus formed forced through the pipes 8 into the larger pipe 6. This will lift the circulating medium into the top tank or vessel 17 filling it up until it can overflow into the protruding pipe H. In passing downwardly through pipe H, the water will start the turbine I. It will then take its way through the box K and the pipes L, back to the box 7, arriving with a certain speed at the openings of the pipes 6. Its speed will be increased by the fresh quantities of gas expelled from the pipes 8, until a certain equilibrium will be reached. The gas escaping from the upper extremities of the pipes 6 into the top vessel 17, passes on through the moisture collector M and pipe N, into the condenser 13 where it is condensed and pumped back into the bottom compartment 9 of the box 7. The small quantities of water or whatever other fluid may be used, which are carried over with the gases and particularly in the case of carbon disulfid, will collect on the surface of the latter. I have provided the extra pipe 20 and pump 21, for use in returning it to the top vessel 17, whenever it shall have accumulated sufficiently for the purpose. In case the gas-producing medium is lighter than the circulating fluid, the latter forms the bottom layer and connections must be changed accordingly.

There are many substances that may be advantageously employed for gas-producing purposes in the use of my improved apparatus. Those found to be best adapted are carbon bisulfid, ether, the light coal oils, benzin, gasolene, chloroform, alcohol and a considerable number of other organic substances. As a moving fluid, I prefer water or a solution of some heavy substance in water, but any substance fluid at the temperature employed and which is at that temperature not a solvent of the other gas-forming substance, may be substituted for it. The moving fluid ought to be as heavy as possible, as that property will allow the apparatus to be built lower for the same amount of power. The gas formed must easily separate from the fluid after having done its work, hence it should not be soluble in the moving fluid.

In mentioning the advantages of my improved apparatus, it may be stated that a steam engine plant converts usually only from eight to ten per cent. of the heat contained in the fuel, into useful work. About fifty-three per cent. of all the heat contained in the fuel is lost as latent heat with the ex- the gases escaping from the boiler on account of incrustations, and the high temperature at which they leave the fuel. If, however, carbon disulfid be employed as the gas-forming fluid, the latent heat of which is only about one-sixth of that of water, there will be a waste of only one-sixth of the heat lost in a proportional amount of exhaust steam. Further as the combustion or heat supplying gases leave the apparatus at a temperature below the boiling point of the water or other substance used as a moving fluid, while the temperature of the combustion gases of a steam plant is about 300° C., there is a considerable gain in this respect. Another gain is to be found in the fact of less loss by radiation, this apparatus as has been explained, being set almost totally inside of the heating chamber. There is also less power consumed for pumping water to the condenser.

Having thus described my invention, what I claim is:

1. In apparatus for producing power, the combination of a circulating-liquid-containing tank, including open-ended pipes, chambers at the top and bottom respectively with which the opposite extremities of the said pipes communicate, the lower chamber having a bottom compartment, tubes leading from the said compartment, passing through said chamber and protruding into the lower extremities of said pipes, means for heating the circulating liquid within the tank, a condenser, means for passing a gas-generating fluid from the condenser into the bottom compartment of the lower chamber, a conduit leading from the upper chamber for the passage of the gas to the condenser, a motor, a conduit leading from the said upper chamber to the motor for the passage of the circulating liquid, a chamber in communication with the motor for the reception of the circulating liquid, and a connection between said chamber and the bottom chamber of the tank for the return of the circulating liquid to the latter.

2. In power-producing apparatus, the combination of a circulating-liquid tank, a condenser, a motor, means for heating the circulating liquid within its tank, means for passing a gas-generating fluid from the condenser into the circulating liquid of the tank, means for returning the gas generated in the circulating-liquid tank, to the condenser, and distinct means for carrying the circulating liquid from the said tank to the motor, and means for returning the said liquid directly to the tank after passing through the motor, substantially as described.

3. The combination of a circulating liquid tank, having chambers at the top and bottom, a condenser, a motor, open ended pipes connecting the said chambers, tubes passing through the lower chamber and entering the lower extremities of the said pipes, means for introducing a gas-producing fluid from the condenser into the lower extremities of the said tubes, a conduit leading from the upper chamber of the tank to the condenser, a second conduit leading from the upper chamber of the tank for the passage of the circulating liquid to the motor, and means for returning the circulating liquid to the lower chamber of the tank after passing through the motor, substantially as described.

4. The combination of a circulating-liquid tank having a chamber at the top, open ended pipes communicating at one extremity with the said chamber, a bottom chamber with which the lower extremities of the pipes communicate, open ended tubes passing through the lower chamber and entering the lower extremities of the pipes, means for introducing a gas-producing fluid into the said tubes, means for heating the circulating liquid within the tank whereby the gas-producing liquid delivered to the circulating liquid is generated into gas, means for removing the gas from the upper chamber of the tank, a conduit leading from the upper chamber of the tank for the passage of the circulating medium for power-producing purposes, and means for returning the circulating liquid to the bottom chamber of the tank, substantially as described.

5. In power-producing apparatus, the combination of a casing, a bottom chamber located in the casing, and separated from the main chamber of the casing, a top chamber also separated from the main chamber of the casing, open ended pipes connecting the two chambers, the lower chamber, the pipes and the lower part of the top chamber containing a circulating liquid, means for introducing a gas-producing fluid into the lower chamber, a motor, a conduit for the passage of the circulating liquid from the upper chamber to the motor, means for returning the circulating liquid to the lower chamber, and means located within the main casing chamber for heating the circulating liquid, substantially as described.

6. In power-producing apparatus, the combination of a casing, open ended pipes located in the chamber of the casing but having no communication therewith, a chamber with which the lower extremities of the said pipes are in communication, another chamber with which the upper extremities of the pipes are in communication, the pipes and the said chambers containing a circulating liquid, means for introducing a gas-producing fluid into the lower chamber, means located in the casing chamber for heating the circulating liquid, a conduit leading from the upper chamber, a motor with which said conduit is connected, and means for returning the circulating liquid directly to the lower chamber after passing through the motor, substantially as described.

7. The combination of a circulating-liquid-containing tank, means for introducing a gas-generating fluid into the bottom of the circulating liquid tank, a motor, a conduit leading from the upper extremity of the said tank for the passage of the circulating liquid to the motor, a condenser, a distinct conduit for returning the gas from the top of the circulating liquid tank to the condenser, the bottom of the condenser being in communication with the bottom of the circulating liquid tank, means for returning the circulating liquid from the motor to the bottom of said tank, and means for heating the circulating liquid for the purpose set forth.

In testimony whereof I affix my signature in presence of two witnesses.

PAUL DANCKWARDT.

Witnesses:
A. J. O'BRIEN,
DENA NELSON.